United States Patent [19]

Grindahl et al.

[11] Patent Number: 4,799,059

[45] Date of Patent: Jan. 17, 1989

[54] AUTOMATIC/REMOTE RF INSTRUMENT MONITORING SYSTEM

[75] Inventors: Mervin L. Grindahl; Quentin S. Denzene, both of Waseca, Minn.

[73] Assignee: EnScan, Inc., Minneapolis, Minn.

[21] Appl. No.: 839,889

[22] Filed: Mar. 14, 1986

[51] Int. Cl.$^4$ ............................................. G08C 17/00
[52] U.S. Cl. ........................... 340/870.03; 340/870.28; 340/825.54; 455/88
[58] Field of Search ...................... 340/870.02, 870.03, 340/825.08, 825.48, 825.54, 825.77, 505, 870.11, 870.12, 870.13, 870.28, 825.06; 371/37; 342/50; 375/1, 55, 87, 76; 331/78; 370/95, 96, 50, 69.1; 455/53, 54, 105, 228, 88, 58

[56] References Cited

U.S. PATENT DOCUMENTS

| | | |
|---|---|---|
| 3,531,771 | 9/1970 | Jaxheimer et al. |
| 3,566,384 | 2/1971 | Smith et al. |
| 3,609,726 | 9/1971 | Stewart, Jr. |
| 3,656,112 | 4/1972 | Paull |
| 3,705,385 | 12/1972 | Batz |
| 3,737,858 | 6/1973 | Turner et al. |
| 3,742,142 | 6/1973 | Martin |
| 3,778,771 | 12/1973 | Whitaker |
| 3,815,119 | 6/1974 | Finlay, Jr. |
| 3,820,073 | 6/1974 | Vercellotti et al. |
| 3,868,640 | 2/1975 | Binnie et al. |
| 3,878,512 | 4/1975 | Kobayashi et al. |
| 3,899,774 | 8/1975 | Binnie et al. |
| 3,900,842 | 8/1975 | Calabro et al. |
| 3,922,492 | 11/1975 | Lumsden |
| 3,967,202 | 6/1976 | Batz |
| 4,012,734 | 3/1977 | Jagoda et al. |
| 4,013,959 | 3/1977 | Patterson |
| 4,020,477 | 4/1977 | Holland |
| 4,031,513 | 6/1977 | Simciak |
| 4,040,046 | 8/1977 | Long et al. |
| 4,104,629 | 8/1978 | Isbister et al. ......................... 342/43 |
| 4,151,510 | 4/1979 | Howell et al. ......................... 371/40 |
| 4,234,874 | 11/1980 | Saya ..................................... 340/539 |
| 4,241,237 | 12/1980 | Paraskevakos et al. |
| 4,312,072 | 1/1982 | Vogel ..................................... 375/1 |
| 4,344,171 | 8/1982 | Lin et al. ............................... 371/35 |
| 4,352,201 | 9/1982 | Miller ................................... 455/58 |
| 4,387,465 | 6/1983 | Becker ................................... 375/1 |
| 4,446,462 | 5/1984 | Ouellette et al. ............... 340/825.07 |
| 4,578,598 | 3/1986 | Faulhaber ............................ 331/78 |
| 4,614,945 | 9/1986 | Brunius et al. ................ 340/870.03 |
| 4,653,068 | 3/1987 | Kadin ..................................... 375/1 |

OTHER PUBLICATIONS

"Error-Correction Coding for Digital Communications", Clark, Jr. et al., Jun. 1981, pp. 84–85 and 394–397.

Chapter 6 (pp. 141-181), of a book entitled, "Error Control Coding: Fundamentals and Application.", Lin et al., 1983.

Chapter 4, (pp. 85-111), of a book entitled "Error Control Coding: Fundamentals and Application.", Lin et al., 1983.

Primary Examiner—John W. Caldwell
Assistant Examiner—Edwin C. Holloway, III
Attorney, Agent, or Firm—Kinney & Lange

[57] ABSTRACT

An improved automatic/remote RF instrument monitoring system including a plurality of transponders configured to operate with one of a plurality of parameter sensing instruments remotely located from an interrogate/receiver. The interrogate/receiver transmits RF transponder activation signals in the form of a tone modulated onto a carrier. In response to the activation signals, the transponders "wake-up" and transmit an RF transponder signal which is received and processed by the interrogate/receiver. The transponders include a transmission enable circuit which initiates transmission of the RF transponder signals at random times after receipt of the activation signals. The RF transponder signals are formed by a plurality of spaced transponder information packets. Transponder information packets of the transponder signal are transmitted at pseudorandom frequencies as a Manchester encoded bit stream including a preamble field of predetermined preamble data, an instrument parameter field of data sensed by the instrument, an instrument identification field of instrument identification data, and an error control code field of BCH error control code data.

32 Claims, 8 Drawing Sheets

Fig. 4  1111100101010011000000

Fig. 6A
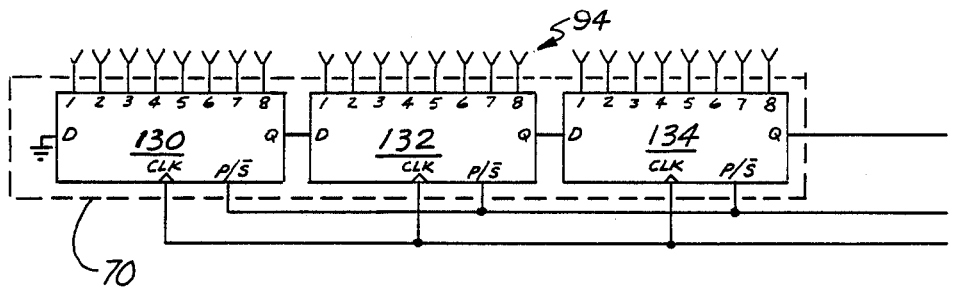
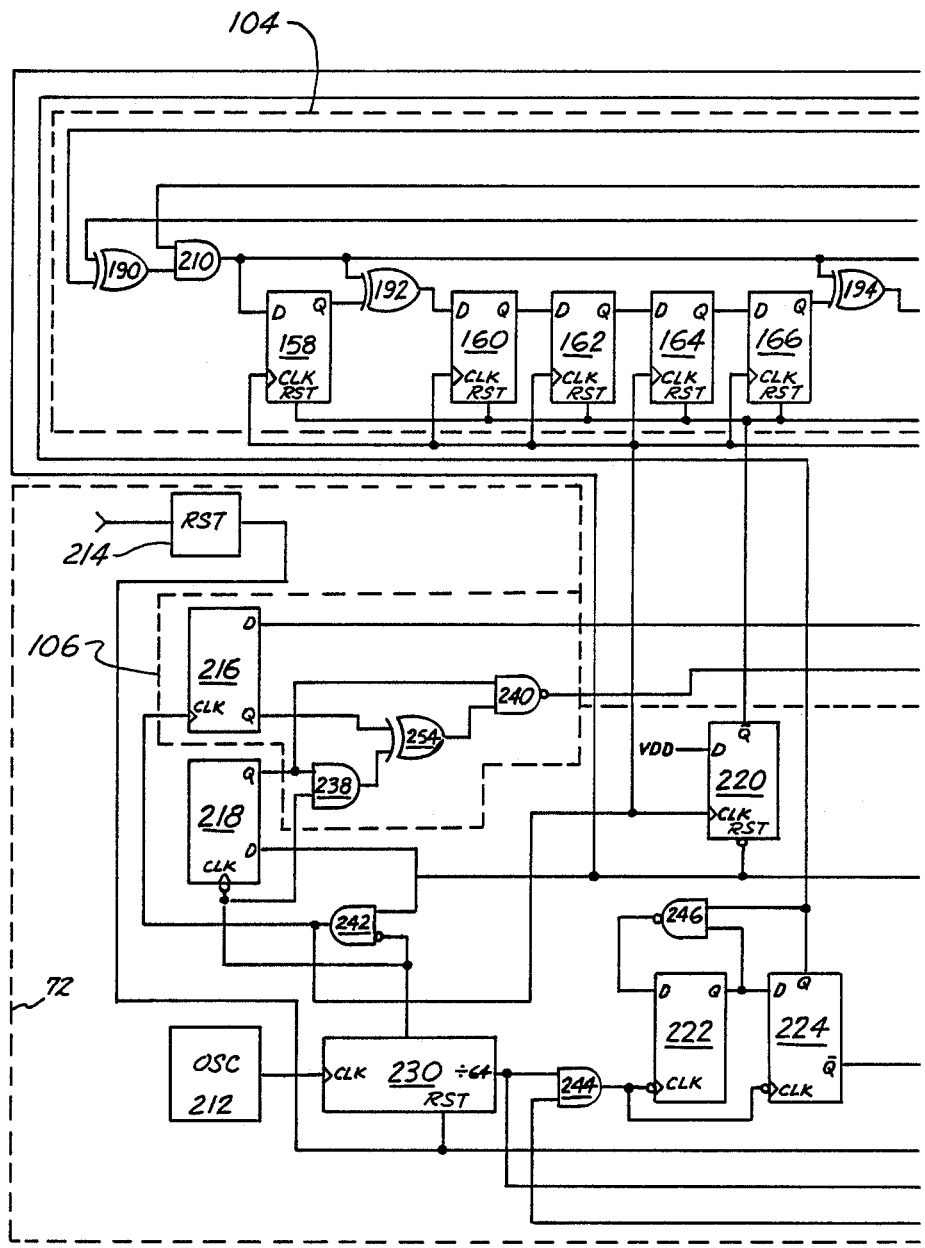

AUTOMATIC/REMOTE RF INSTRUMENT MONITORING SYSTEM

REFERENCE TO CO-PENDING APPLICATION

Reference is hereby made to a co-pending application entitled Automatic/Remote RF Instrument Reading Method and Apparatus identified in the United States Patent and Trademark Office by Ser. No. 06/703,621 issued on Sept. 30, 1986 as the Brunius et al. U.S. Pat. No. 4,614,945, and assigned to the same assignee as the present invention.

BACKGROUND OF THE INVENTION

1. Field of the Invention

The present invention relates to remote instrument monitoring systems. In particular, the present invention is an improved transponder and interrogate/receiver for use in a remote RF instrument monitoring system.

2. Description of the Prior Art

Commodities such as gas, water, and electricity have been tradionally monitored by meters physically located at the consumer's facility or residence. The sight of meter reading personnel walking from door to door and recording by hand the accumulated meter reading is a common one with which nearly everyone is familiar. Although this meter reading technique is traditional, it is inefficient, susceptible to error, requires many employees, and is very expensive.

Apparatus and methods for automatically communicating data from a plurality of remotely located parameter sensing instruments, such as commodity meters, to a central data acquisition system have, in fact, been developed. One such system is disclosed in a patent application entitled AUTOMATIC/REMOTE RF INSTRUMENT READING METHOD AND APPARATUS (hereinafter referred to as Instrument Reading Apparatus) which is identified in the United States Patent and Trademark Office by Ser. No. 06/703,621 issued on Sept. 30, 1986 as the Brunius et al. U.S. Pat. No. 4,614,945, and assigned to the same assignee as the present invention. The Instrument Reading Apparatus disclosed therein includes a plurality of transponders. or Encoder/Receiver/Transmitters (ERTs), one of which is associated with each remotely located meter or instrument. Also included is an interrogate/receiver, which can be included within a mobile data acquisition system. The interrogate/receiver transmits a "wake-up" or activation signal. All transponders then within range of the interrogate/receiver wake up and initiate transmission of an RF transponder signal which includes account data representative of the parameter sensed by a particular meter with which it is associated. The interrogate/receiver simultaneously receives the transponder signals from all activated transponders, and stores the account data contained therein. Account data is later removed and used for utility billing purposes.

In the Instrument Reading Apparatus, the transponder signals are comprised of a series of spaced transmission bursts, each of which includes the account data. In order to reduce the probability of transmission collisions, i.e., the simultaneous transmission of a transponder signal from two or more transponders at the same time and/or at the same frequency, the transponder signal is characterized by active time and/or frequency parameters. Each transponder causes the frequency at which the transmission bursts of a transponder signal are transmitted to very so as to occur at different frequencies within a predetermined bandwidth. In addition, the spacing in time between transmission bursts of different transponders vary, although the spacing in time between transmission bursts of any given transponder is constant.

Although the active time and/or frequency parameters utilized by the Instrument Reading Apparatus significantly reduce transmission collisions between simultaneously activated transponders, they do not do so to the extent required of a commercially viable product. Transmission collisons still occur with enough regularity to prevent reliable data communication with the interrogate/ receiver at economically feasible rates.

Another problem with the Instrument Reading Apparatus described above concerns the accuracy of data communications between the transponders and the MDAS. All data communication systems, especially digital RF systems such as that described above, can be characterized by a statistical probability of error. Despite this fact, error detection techniques implemented by the Instrument Reading Apparatus are quite limited. They include determining whether the preamble received has the proper sequence of digital values, and whether the correct number of bits have been received. Even if these techniques indicate receipt of a "valid" transmission, there is apparently no way to determine if the encoded data representing the meter reading was valid, i.e., received as transmitted.

Yet another very important feature of a commercially viable instrument monitoring system is the length of time that it can operate without requiring a new supply of power such as that provided by batteries. The instrument monitoring system described above activates the transponders by an activation signal in the form of an RF carrier of predetermined frequency. Various communication services operating within the same frequency range as the carrier cause a certain amount of falsing, accidentally walking up the transponders. Accidental wake-ups initiate the transmission of the transponder signal, and thereby waste battery life.

It is evident that there is a continuing need for improved automatic/remote RF instrument monitoring systems. To be commercially viable, the system transponders must meet several requirements. First, the transponder must be capable of producing collision resistant transmissions. Active time and/or frequency parameters which result in transponder signals with collision resistant characteristics superior to those of known techniques must be developed. A transmission protocol capable of accurate transmission is also required. The protocol must provide the capability for detecting errors in the transmitted data representative of the sensed parameter. The transponders should also be resistant to false wake-ups. These and other characteristics must be achieved with a relatively inexpensive transponder which is highly reliable.

SUMMARY OF THE INVENTION

The present invention is an improved automatic/-remote instrument monitoring system. The system includes a plurality of transponders, each of which is associated with one of a plurality of parameter sensing instruments which are remotely located from an interrogate/receiver. In response to activation signals from the interrogate/receiver, the transponders transmit an RF transponder signal formed by a plurality of transponder information packets. The transponder is extremely reliable and yet cost effective. Its collision resistant transmission characteristics allow instruments to be monitored, or read, at a rapid and efficient rate. Data communication accuracy is enhanced by error control techniques. Battery life, and transponder flexibility, is also enhanced through use of a wake-up technique which is falsing resistant.

In one embodiment, the transponders are characterized by a circuit for implementing a highly accurate transmission protocol. The circuit includes preamble field means for providing a preamble field of predetermined preamble data. Instrument parameter field means are adapted for interconnection to a parameter sensing instrument, and provide an instrument parameter field of instrument parameter data sensed thereby. Instrument identification field means provide an instrument identification field of instrument identification data. Error control coding means error control codes at least a portion of the fields of data, and provide an error control code field of error control code data. The fields of preamble data, instrument parameter data, instrument identification data, and error control code data are assembled in a predetermined manner so as to produce a transponder information packet formed by a bit stream of data by sequence control means. Transmission encoding means transmission encode the transponder information packet, and produce a transmission encoded bit stream of data which is adapted for transmission by the RF transponder.

In a second preferred embodiment, each transponder is characterized by pseudorandom frequency varying means for causing the frequency of the transponder signal to vary, so that each transponder information packet is transmitted at a pseudorandom frequency. The transponders include instrument parameter field means adapted for interconnection to a parameter sensing instrument for providing an instrument parameter field of data. Transmission enable means receive an RF activation signal from the interrogate/receiver, and provide a transponder enable signal in response thereto which initiates production and transmission of the transponder signals. RF transmitter means are operatively coupled to receive the instrument parameter field of data, and transmits a transponder signal comprising a plurality of spaced transponder information packets. Pseudorandom transmission frequency varying means are operatively connected to the transmitter means and pseudorandomly vary the frequency of the RF transponder signal such that the transponder information packets are transmitted at pseudorandom frequencies within a predetermined frequency bandwidth.

In yet another embodiment, transponders of the system are characterized by enable circuit means for initiating the transmission of the transponder signals at random times upon receipt of the activation signal. The enable circuit means includes RF detector means for receiving the RF activation signal from the interrogate/receiver. The RF detector means detects the activation signal, and produces a detector signal representative thereof. Also included are timing means for timing integration periods. Integration periods of the transponders are randomly skewed with respect to each other. Integrator means are operatively coupled to the timing means and the RF detector means and integrate the detector signal over the integration period, thereby producing an integrator output signal representative of an integral of the detector signal. Comparator means compare the integrator output signal to a threshold value, and produce a transponder enable signal if the integrator output signal attains the threshold value during the integration period.

BRIEF DESCRIPTION OF THE DRAWINGS

FIG. 4 illustrates a preferred sequence of digital values forming a preamble field of the transponder information packet shown in FIG. 3.

FIGS. 6A–6D are arranged from left to right, respectively, and schematically illustrate a preferred circuit implementation of several blocks illustrated in FIG. 5.

DETAILED DESCRIPTION OF THE PREFERRED EMBODIMENTS

The present invention is an improved automatic/remote RF instrument monitoring system such as that disclosed in the co-pending application referred to above. Each transponder of the system transmits an RF transponder signal utilizing a novel data transmission protocol. Transponder signals are formed by a plurality of spaced transponder information packets, each of which begins with a unique preamble, and ends with a Cyclic Redundancy Check error control code. The error control code is decoded by an interrrogate/receiver, and utilized to increase the accuracy and reliability of data communications. Transponder information packets are transmitted at pseudorandom frequencies to reduce collisions between transmissions of simultaneously transmitting transponders. Collisions are further reduced by a circuit which causes transponders to "wake-up" and initiate data transmission at random times. These and other features of the invention will be best understood following a brief description of the instrument monitoring system to which they relate.

Figure 1:
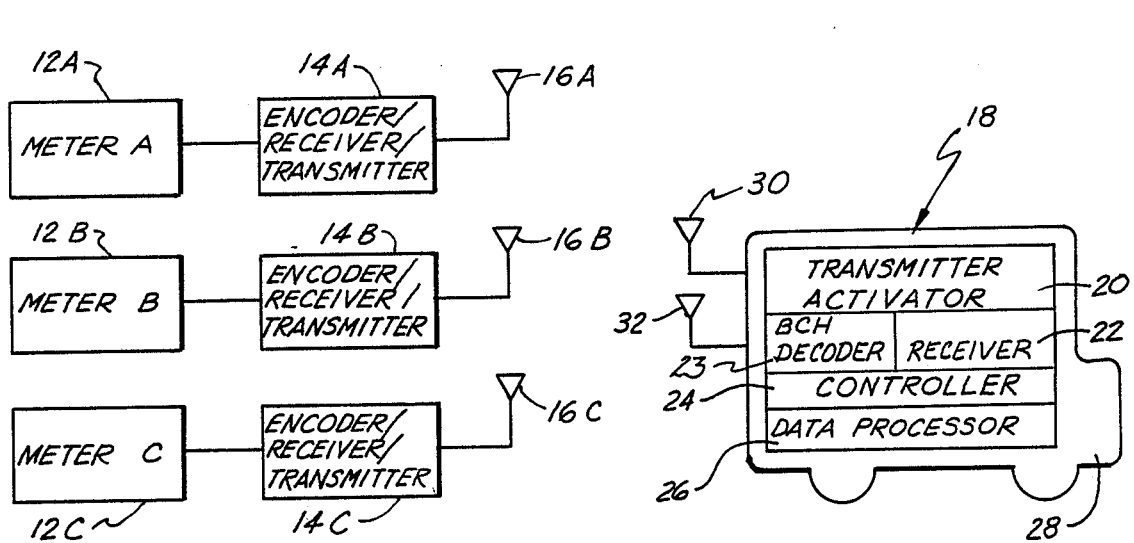
FIG. 1 is a block diagram representation of an automatic/remote RF instrument monitoring system including transponders of the present invention.

An automatic/remote RF instrument monitoring system is illustrated generally in FIG. 1. As shown, automatic/remote instrument monitoring system 10 is adapted for use with a plurality of remotely located parameter sensing instruments such as meters 12A–12C. Meters 12A–12C sense or monitor a physical parameter, such as a quantity of a given commodity (e.g. natural gas) used by a residential or business customer. Associated with and operatively coupled to each meter 12A–12C is a transponder 14A–14C. Each transponder 14A–14C includes an antenna 16A–16C, respectively, for receiving and transmitting radio frequency (RF) signals. transponders 14A–14C accumulate and digitally store parameter data sensed by meters 12A–12C, respectively. Parameter data, as well as other account information such as identification data identifying meters 12A–12C from which the parameter data was sensed, is encoded for transmission in an RF transponder signal by transponders 14A-14C when activated, or polled.

Instrument monitoring system 10 also includes an interrogate/receiver 18. Interrogate/receiver 18 includes transmitter activator 20, receiver 22, which includes BCH decoder 23, controller 24, and data processor 26 which are preferably carried by a mobile vehicle 28 such as a van. In still other embodiments, (not shown), interrogate/receiver 28 is stationary. Transmitter activator 20 transmits RF activation signals to transponders 14A-14C via antenna 30, while RF transponder signals from transponders 14A-14C are received by receiver 22 through antenna 32.

Transmitter activator 20 of interrogate/receiver 18 will generate a polling or activation signal which is transmitted through antenna 30. In the embodiment shown, vehicle 28 will proceed down a roadway, carrying interrogate/receiver 18. All transponders 14A-14C within range of transmitter activator 20 will be activated, or "wake-up" upon receipt of the activation signal through their antennas 16A-16C. Once activated, transponders 14A-14C produce and transmit their RF transponder signals which includes the parameter and identification data. Transponder signals are received by receiver 22, and the data contained therein is decoded. This data is then further processed, and stored, by data processor 26 under the control of controller 24. At the end of a day, or after all meters 12A-12C have been read, all parameter, identification, and other account information is transferred to a utility billing system (not shown) through a storage medium, serial data interface, or other data transmission scheme. These and other features of instrument monitoring system 10 are described in freater detail in the above-identified co-pending application.

Transponders 14A-14C all function in a similar manner, and are preferably identical to facilitate high volume, low cost construction. To this end, transponders 14A-14C can utilize a custom large scale integrated circuit, and only a few other components. All subsequent descriptions are therefore made with reference to transponder 14A, which is representative of transponders 14A-14C.

Figure 2:
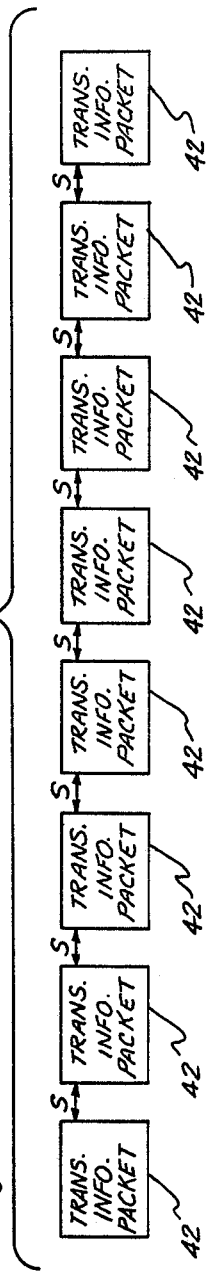
FIG. 2 is a diagrammatic illustration of a preferred transponder signal transmitted by each transponder of FIG. 1.

FIG. 2 is a diagrammatic illustration of an RF transmission cycle, or transponder signal 40, as produced and transmitted by transponder 14A upon receipt of an activation signal from interrogate/receiver 18. As shown, transponder signal 40 is comprised of a series of spaced transmission bursts, or transponder information packets 42. In one preferred embodiment, transponder 14A produces a transponder signal 40 comprising eight transponder information packets 42. Each transponder information packet 42 is preferably separated in time from adjacent transponder information packets 42 by a predetermined period S. As will be described in greater detail in subsequent portions of this specification, transponder 14A begins the transmission of transponder signal 40 at a random time after receipt of the activation signal. Furthermore, each transponder information packet 42 is transmitted at a pseudorandom frequency.

Figure 3:
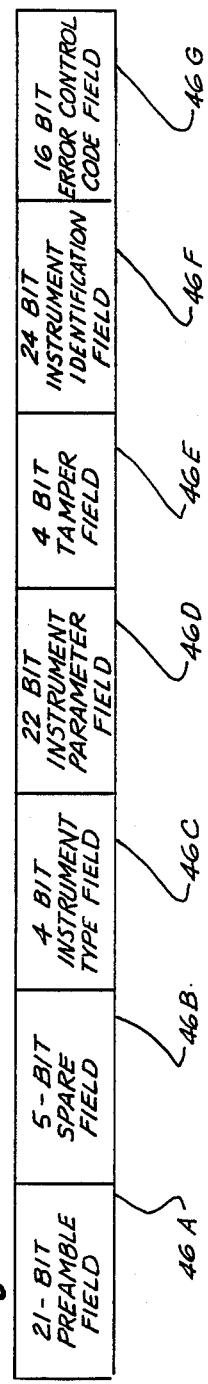
FIG. 3 is a diagrammatic illustration of a preferred form of the transponder information packets forming the transponder signal illustrated in FIG. 2.

Each transponder information packet 42 is identical, and is formed by a bit stream of digital data. As illustrated in FIG. 3, transponder information packets 42 are divided into a plurality of data fields including preamble field 46A, spare field 46B, instrument type field 46C, instrument parameter field 46D, tamper field 46E, instrument identification field 46F and error control code field 46G. Each data field 46A-46G has a predetermined length, and contains data representative of different types of information.

The transmission of each transponder information packet 42 begins with preamble data field 46A. In the embodiment shown in FIGS. 3 and 4, preamble data field 46A is 21 bits long. Preamble data field 46A is formed by a predetermined sequence of digital data, and is used by interrogate/receiver 18 to identify a valid incoming transmission from transponder 14A. Preamble data field 46A provides bit sync and word synch for digital decoders within receiver 22 as well. Bit sync is used to synchronize a data clock (not shown) of receiver 22 to transponder information packet 42, while word sync provides protection against false messages generated by noise. In general, the longer the sync word, the smaller the probability of preamble data field 46A being detected as noise.

In one preferred embodiment, transponder information packets 42 are produced with a preamble data field 46A illustrated in FIG. 4. As shown, preamble data field 46A is representative of a 111110010101001100000 bit sequence of digital values. the first bit of this sequence is used by receiver 22 for hardware initialization purposes. The sequence of digital values illustrated in FIG. 4 provides excellent characteristics for statistical signal processing techniques, such as auto correlation or cross-correlation, which are implemented by receiver 22 to determine whether a received signal is one transmitted from transponder 14A. In one embodiment, a received signal is recognized as a transponder information packet 42 by receiver 22 only if the signal processing performed thereby indicates that all bits of preamble data field 46A were correctly received.

Referring back to the preferred embodiment of transponder information packet 42 shown in FIG. 3, a spare data field 46B is shown to follow preamble field 46A. Spare field 46B is preferably five bits in length, and is reserved for future use when it may become necessary or desirable to expand the length of data fields 46A, 46C-46G, or to transmit auxiliary data such as that characterizing other aspects of transponder 14A or meter 12A. By including spare field 46B, transponder 14A can easily accommodate later modifications.

Instrument type data field 46C follows spare bit 46B in the preferred embodiment, and is four bits in length. Instrument type field 46C contains data representative of the particular type of instrument with which transponder 14A is associated. In one preferred application, instrument monitoring system 10 is a gas meter monitoring system and instrument type field 46C contains a four bit code representative of gas meters. In still other applications, instrument monitoring system 10 monitors other consumer commodities such as water and electricity, and instrument type field 46C contains a four bit code representative of these particular systems.

Instrument parameter field 46D follows instrument type field 46C in the preferred embodiment shown in FIG. 3. Instrument parameter field 46D is preferably twenty-two bits in length, and contains data representative of the parameter sensed by meter 12A.

Tamper field 46E follows instrument parameter field 46D. Tamper field 46E is preferably a four bit field and contains data representative of tampering, such as movement of or unauthorized entry into transponder 14A and/or meter 12A. In one preferred embodiment, taper field 46E contains data representative of a number of instances of such tampering.

Instrument identification field 46F preferably follows tamper field 46E, and is twenty-four bits long. Instrument identification field 46F contains data identifying the particular meter 12A with which transponder 14A is associated. Each transponder 14A-14C of instrument monitoring system 10 preferably has a unique identification code which is transmitted within its instrument identification field 46F.

Transponder information packets 42 preferably end with error control code field 46G. As will be described in greater detail in subsequent portions of this specification, predetermined portions of at least some of data fields 46A-46F are error control coded, and an error control code is produced as a function of the data contained therein. The error control code is preferably a sixteen bit code.

Fikgure 5 is a block diagram representation of a preferred embodiment of transponder 14A. Included is preamble field shift register 60, spare field shift register 62, instrument type field shift register 64, instrument parameter field shift register 66, tamper field shift register 68, and instrument identification field shift register 70. Each shift register 60-70 is interconnected to, and under the control of, sequence timing control 72. Shift registers 60-70 are connected to receive data from preamble data source 74, spare data source 80, instrument type data source 84, instrument parameter data source 88, tamper data source 92 and instrument identification data source 96, respectively. As shown, transponder 14A also includes transmission enable circuit 100, data path control 102, BCH encoder 104, Manchester encoder 106, pseudorandom number generator 108, digital-to-analog converter 110, transmitter 112, and antenna 16A.

Preamble field shift register 60 is connected to receive preamble data in a parallel format on dta bus 76 from preamble data source 74. In one preferred embodiment, data bus 76 is hard wired to supply potentials representative of first and second digital values (i.e., logic "0" and logic "1") so as to provide a preamble data field in the form illustrated in FIG. 4.

Spare field shift register 62 is connected to receive spare data in a parallel format on bus 78 from spare data source 80. Spare data source 80 can be any source of additional data which is desired to be included within transponder information packet 42. Until transponder 14A is modified for transmission of additional data, bus 78 will preferably be wired to supply potentials representative of predetermined digital values.

Instrument type field shift register 64 is connected to receive instrument type data in a parallel format on bus 82 from instrument type data source 84. Bus 82 can, for example, be hard wired to supply potentials representative of the instrument type code. Alternatively, instrument type data source 84 can include a microswitch interfacing bus 82 to supply potentials, for switchably selecting the instrument type code.

Instrument parameter field shift register 66 is connected to receive instrument parameter data in a parallel format on bus 86 from instrument parameter data source 88. In a preferred embodiment, instrument parameter data source 88 is of the type disclosed in the co-pending application previously referenced, which interfaces directly to meter 12A, and provides a digital signal representative of the meter reading (i.e., sensed parameter) indicated on the meter index dials.

Tamper field shift register 68 is connected to receive tamper data in a parallel format on bus 90 from taper data source 92. Tamper data source 92 is preferably a tamper detection apparatus of the type disclosed in the previously identified co-pending patent application. This form of tamper data source 92 detects tampering in the form of unauthorized entry into, or movement of, transponder 14A and/or meter 12A, and produces a numerical count representative of the number of instances of such tampering.

Instrument identification field shift register 70 is connected to receive instrument identification data in parallel format on bus 94 from instrument identification data source 96. Bus 94 is preferably wired to supply potentials to provide a unique digital number identifying transponder 14A, and therefore meter 12A with which it is associated.

Figure 5:
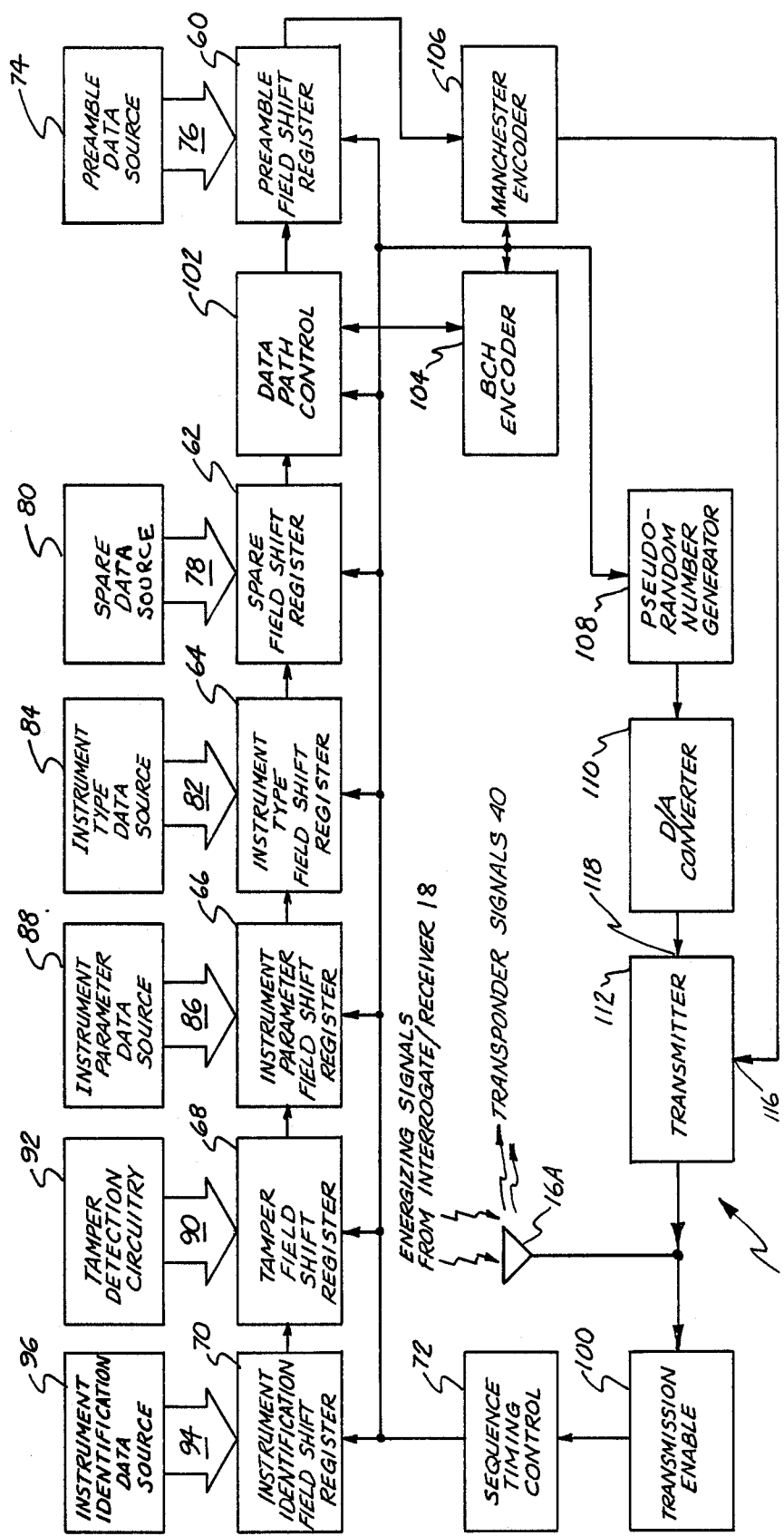
FIG. 5 is a block diagram representation of a preferred embodiment of the transponders shown in FIG. 2.

In the embodiment of transponder 14A shown in FIG. 5, shift registers 60-70 are interconnected with one another, and data path control 102, for serial field data transfer. Shift registers 60-70 are arranged from right to left in FIG. 5, with data path control 102 positioned between preamble field shift register 60 and spare field shift register 62. Upon receipt of an activation signal from interrogate/receiver 18 (FIG. 1), transmission enable circuit 100 prodocues an enable signal which is supplied to sequence control 72. The enable signal causes transponder 14A to "wake-up", and to transmit transponder signal 40. Preferred embodiments of transmission enable circuit 100 are discussed in subsequent portions of this specification. After an enable signal is received from transmission enable circuit 100, sequence timing control 72 coordinates the transmission cycle, or generation and transmission of transponder signal 40 from transponder 14A. This is done by repeatedly (e.g., eight times in the preferred embodiment) assembling and transmitting transponder information packets 42.

Sequence timing control 72 first causes each shift register 60-70 to be loaded, in paralle, with data from their respective sources 74, 80, 84, 88, 92, and 96. Sequence timing control 72 then causes the fields of data within shift registers 60-70 to be serially transferred, or shifted (from left to right in FIG. 5), through preamble field shift register 60, and through data path control 102 and all other intervening shift registers 62-70. Instrument identification data from instrument identification field shift register 70 must, for example, be shifted through tamper field shift register 68, instrument parameter field shift register 66, instrument type field shift register 64, spare field shift register 62, and data path control 102, before being shifted through preamble field shift register 60. Since shift registers 60-70 are arranged in a manner corresponding to the order of data fields 46A-46F of transponder information packets 42, a bit stream of digital data forming fields 46A-46F will be clocked out of preamble field shift register 60 and inputted into Manchester encoder 106.

While clocking data from shift registers 62-70 through data path control 102 to preamble field shift register 60, sequence timing control 72 simultaneously causes data from shift registers 62-70 to be serially transferred through data path control 102 to a Cyclic Redundancy Check (CRC) encoder such as BCH encoder 104. BCH (Bose, Chaudhuri, and Hocquenghem) encoder 104 is one of several types of CRC encoders which produce cyclic error control codes as a function of data inputted thereto. CRC encoders (and decoders) of this type are well known and discussed, for example, in a book entitled "Error Control Coding: Fundamentals and Applications", by Shu Lin and Daniel Costello, Jr., published in 1983 by Prentice-Hall, Inc.

In one preferred embodiment, BCH encoder 104 produces a BCH error control code constructed of a shortened 255, 239, 2 code Galois field generated by the following polynomial:

$$P(X) = 1 + X + X^5 + X^6 + X^8 + X^9 + X^{10} + X^{11} + X^{13} + X^{14} + X^{16}.$$

This particular BCH code is sixteen check bits in length, and has a distance of four on an eighty bit field. This error control code is preferably produced as a function of the spare, instrument type, instrument parameter, tamper, and instrument identification data, and serially outputted BCH encoder 104 as a sixteen bit error control code. Sequence timing control 72 causes the error control code to be serially shifted through data path control 102 to preamble field shift register 60 following the instrument identification data, thereby forming error control code field 46G, the final field of transponder information packet 42.

Any selected portions of data within shift registers 60-70, including the preamble data, can be error control coded, as desired. The preferred embodiment shown in FIG. 5, in which the preamble data is not error control encoded, is shown merely for purposes of illustration. It is advantageous, however, to always error control code the instrument parameter data.

As shown in FIG. 1, receiver 22 of interrogate/receiver 18 includes one or more BCH decoders 23 (one is shown). BCH decoder 23 decodes error control code field 46G of the transponder information packets 42 received by receiver 22. Once decoded, the information from error control code field 46G is processed to determine bit errors within CRC encoded data fields 46A-46F which may have occurred during transmission. The use of BCH encoder 104 therefore increases the accuracy and reliability of communications between transponder 14A and interrogate/receiver 18. BCH decoders such as that shown at 23 are well known, and easily constructed by those skilled in the art to decode the shortened 255, 239, 2 BCH code described above.

Transmission encoding apparatus such as Manchester encoder 106 is connected to receive the bit stream of data forming transponder information packet 42 as it is clocked out of preamble field shift register 60. Manchester encoder 106 (also known as a split-phase encoder) processes, or encodes, the digital data forming transponder information packet 42 into a form better suited for transmission. Manchester encoder 106 preferably implements a Manchester I encoding scheme. Manchester encoders such as 106 are well known and produces a code in which a data clock is embedded into the data stream. Another advantage of Manchester encoder 106 is that it eliminates any DC components in the bit stream as it emerges from preamble field shift register 60. Other transmission encoding schemes, including various non-return-to-zero (NRZ) schemes, can be used as well.

Transmitter 112 includes a modulation control input terminal 116 and a carrier frequency control input terminal 118. Modulation control input terminal 116 is connected to receive the transmission encoded bit stream of data from Manchester encoder 106. Transmitter 112 modulates the bit stream of data forming transponder information packet 42 onto an RF carrier having a carrier frequency determined as a function of a signal received at carrier control terminal 118. The transponder signal 40 (i.e., the modulated carrier) is transmitted to inhterrogate/receiver 18 through antenna 16A. In a preferred embodiment, the Manchester encoded bit stream forming transponder information packet 42 is used to on-off key (OOK) the carrier signal. Other commonly used and well known modulation techniques such as frequency-shift key (FSK) or phase-shift key (PSK) can be implemented as well.

Each transponder information packet 42 of transponder signal 40 is transmitted at a pseudorandom frequency (i.e., a pseudorandom carrier frequency) within a predetermined range of frequencies. In one embodiment, transponder information packets 42 are transmitted at frequencies ranging from 912 MHz to 918 MHz.

In the embodiment of transponder 14A illustrated in FIG. 5, pseudorandom frequency transmission is caused by digital pseudorandom number generator 108 and digital-to-analog (D/A) converter 110. Pseudorandom number generator 108 is preferably a digital state machine, and can be formed from digital logic elements in manners well known to those skilled in the art. Pseudorandom number generators of this type cycle through a plurality of states, producing a digital signal representative of a pseudorandom number in each state. Pseudorandom numbers have characteristics of a purely random sequence of numbers in the sense that they are not strictly sequential, although pseudorandom number generator 108 cycles through only a predetermined number of states, after which the cycle is repeated. Numbers represented by the digital signals produced by pseudorandom number generator 108 can, therefore, be described by a mathematical function.

Sequence timing control 72 causes pseudorandom number generator 108 to cycle states and produce a new pseudorandom number each time a transponder information packet 42 is to be transmitted. The digital signals produced by pseudorandom number generator 108 are converted to analog signals by D/A converter 110, and applied to carrier frequency control terminal 118. The Manchester encoded bit stream is thereby modulated onto a carrier of pseudorandom frequency, and transmitted by transmitter 112 as a transponder information packet.

After a first transponder information packet 42 has been assembled and transmitted in accordance with the above description, sequence timing control 72 causes the same sequence of steps to be repeated a predetermined number of times to complete the transmission cycle and produces transponder signal 40. Sequence timing control 72 preferably causes transponder signal 40 to be formed of eight transponder information packets 42 as shown in FIG. 2. Sequence timing control 72 also causes each transponder information packet 42 to be spaced from those adjacent to it by time period S (FIG. 2), and causes pseudorandom number generator 108 to produce a new pseudorandom number for each transponder information packet 42 so transmitted.

In addition, sequence timing control 72 is unresponsive to enable signals from enable circuit 100 for a predetermined time period, preferably 10 seconds, after transmission of a final transponder information packet 42 of transponder signal 40. If after this predetermined "dead time" period transponder 14A is still within range of interrogate/receiver 18 and receives another activation signal, sequence timing control 72 will initiate transmission of another transponder signal 40.

A preferred embodiment of transponder 14A, less instrument identification data source 96, tamper data source 92, instrument parameter data source 88, instrument type data source 84, spare data source 80, transmission enable circuit 100 and transmitter 112, is schematically illustrated by FIGS. 6A-6D. FIGS. 6A-6D are arranged from left to right, respectively, to form the complete schematic.

As shown, instrument identification field shift register 70 is formed by three eight bit shift registers 130, 132, and 134. Tamper field shift register 68 is formed by one-half (i.e., the four least significant bits) of eight bit shift register 136. Instrument parameter field shift register 66 is formed by a second half (i.e., the four most significant bits) of shift register 136, eight bit shift registers 138, 140, and the two least significant bits of eight bit shift register 142. Instrument type field shift register 64 is formed by four bits of shift register 142, while spare field shift register 62 is formed by the two most significant bits of shift register 142, and the three least significant bits of eight bit shift register 144. Preamble field shift register 60 is formed by the four most significant bits of shift register 144, and by eight bit shift registers 146 and 148.

Figure 6B:
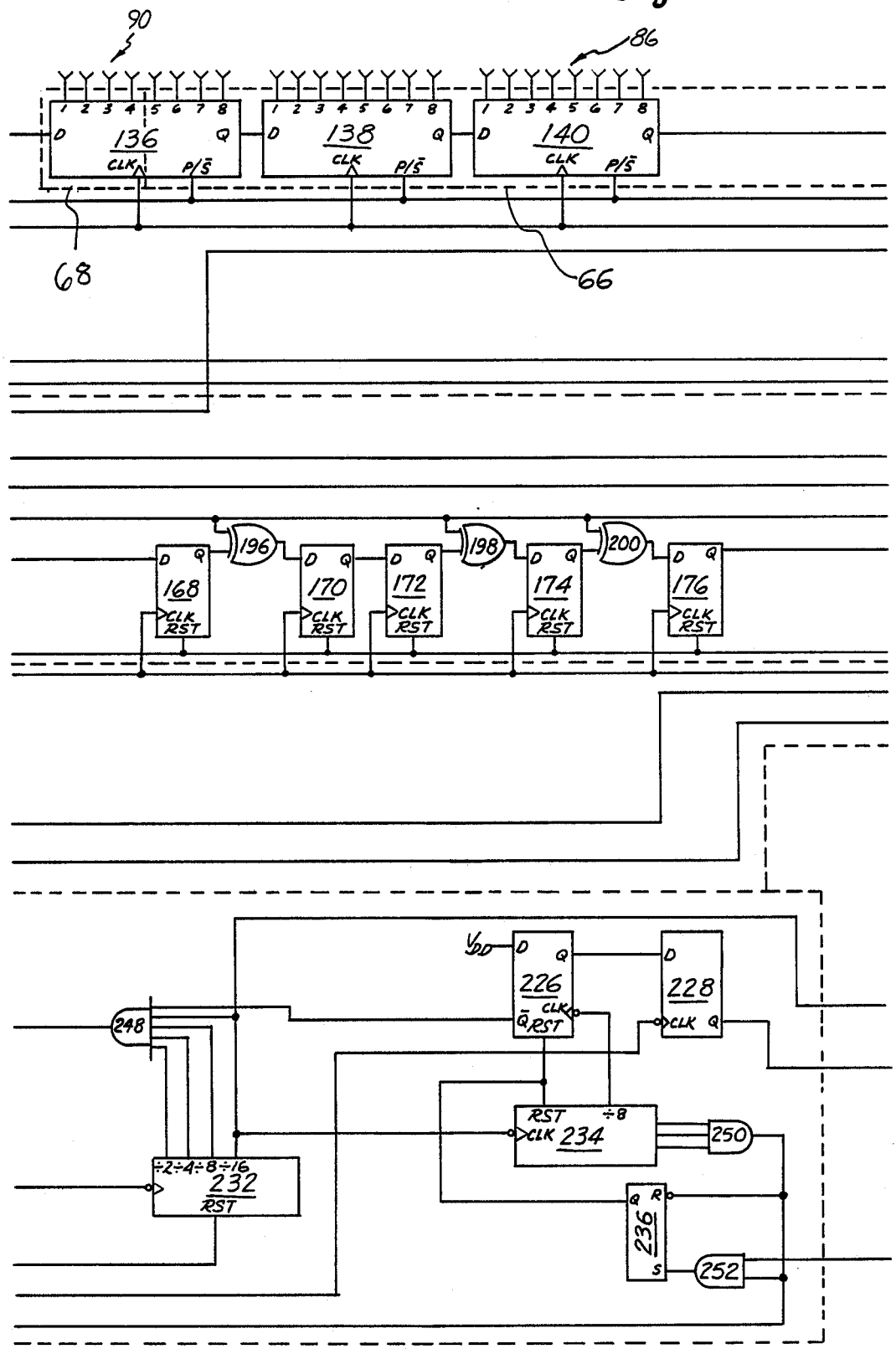
Figure 6C:
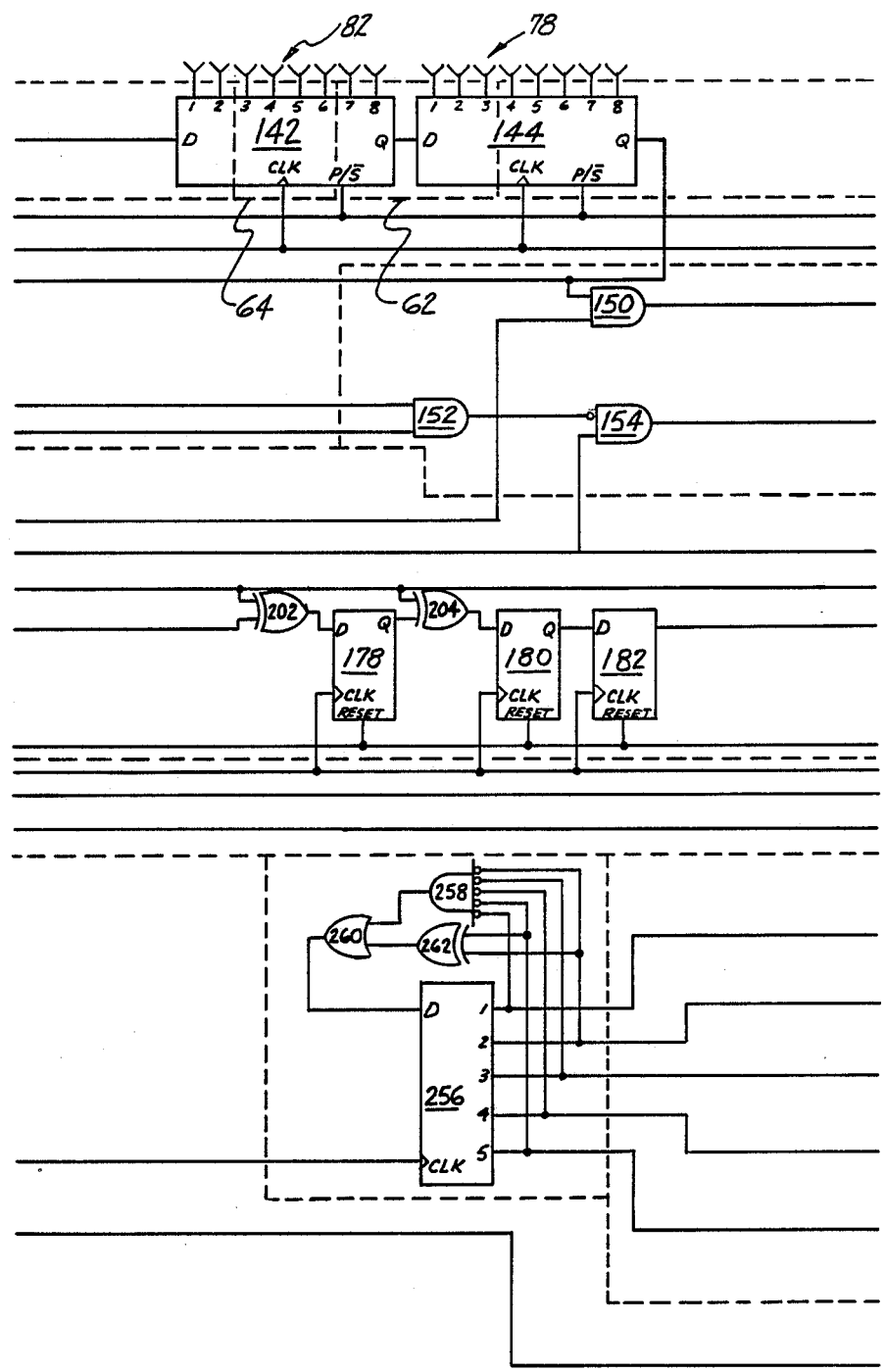
Figure 6D:
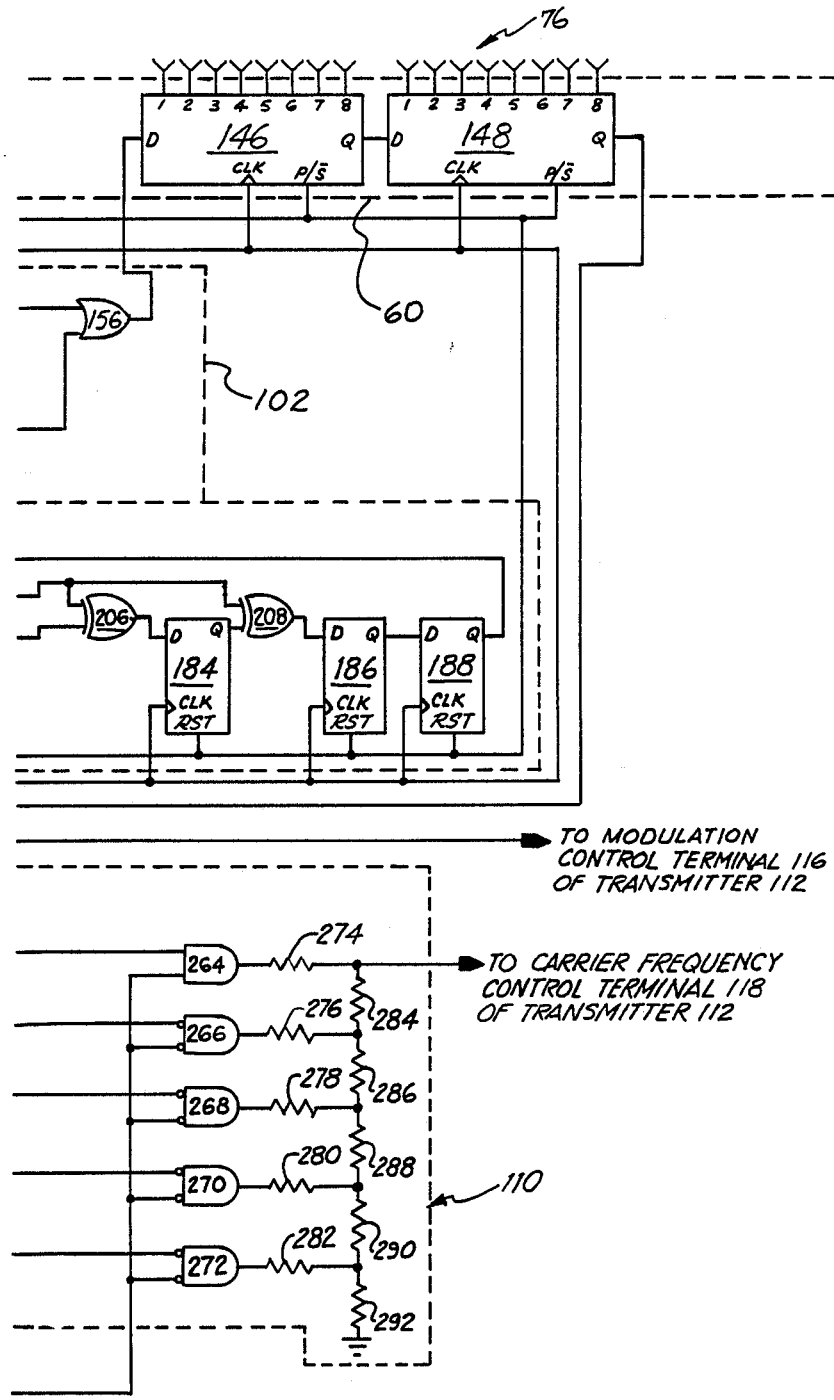

Data path control 102 is formed by AND gates 150, 152, 154, and OR gate 156. BCH encoder 104 is formed by D flip-flops 158-188, EXCLUSIVE-OR gates 190-208, and AND gate 210. As shown in FIG. 6C, only a portion, or the five least significant bits, of preamble field shift register 60 are applied to BCH encoder 104. As a result, only the four least significant bits of the preamble field data are BCH error control encoded in the embodiment of transponder 14A shown in FIG. 6.

Sequence timing control circuit 72 includes oscillator 212, power-up master reset (RST) 214, D flip-flops 218-228, frequency dividers 230-234, RS flip-flop 236, and AND gates 242-252. Master reset circuit 214 causes sequence timing control circuit 72 to be initialized each time a source of power, such as a battery (not shown) is connected to transponder 14A. As shown, enable signals from transmission enable circuit 100 are received by AND gate 252.

Pseudorandom number generator 108 is a 31 state device formed by five bit digital counter 256, AND gate 258, OR gate 260, and EXCLUSIVE-OR gate 262. Digital-to-analog converter 110 is formed by AND gates 264-272, and resistors 274-292. Analog voltages produced by D/A converter 110 are applied to carrier frequency control terminal 116 of transmitter 112 as shown.

Manchester encoder 106 is formed by D flip-flop 216, AND gates 238 and 240, and EXCLUSIVE-OR gate 254. The Manchester encoded bit stream of data representative of transponder information packet 42 is applied to modulation control input terminal 116 of transmitter 112, as shown.

Transponders 14A-14C preferably include a transmission enable circuit 100 which produces enable signals at random times after receiving an activation signal from interrogate/receiver 18. In this manner, each transponder 14A-14C "wakes-up" and begins transmitting its transponder signal 40 at different times with respect to other transponders 14A-14C. This technique helps prevent transmission collisions when transponders 14A-14C within range of interrogate/receiver 18 simultaneously receive an activation signal.

Transmitter activator 22 of interrogate/receiver 18 preferably produces an activation signal in the form of a signal having predetermined frequency characteristics, such as a tone, modulated onto a carrier. The activation signal is a 22-60 Hz tone amplitude modulated onto 915 MHz carrier in one embodiment. Through the use of this technique, different frequency tones can be used as an activation signal for different types of instrument monitoring systems. Gas meter monitoring systems can, for example, have an enable circuit tuned to "wake-up" upon receipt of one tone, while an electric meter monitoring system can have an enable circuit 100 tuned to "wake-up" upon receipt of a second tone.

Figure 7:
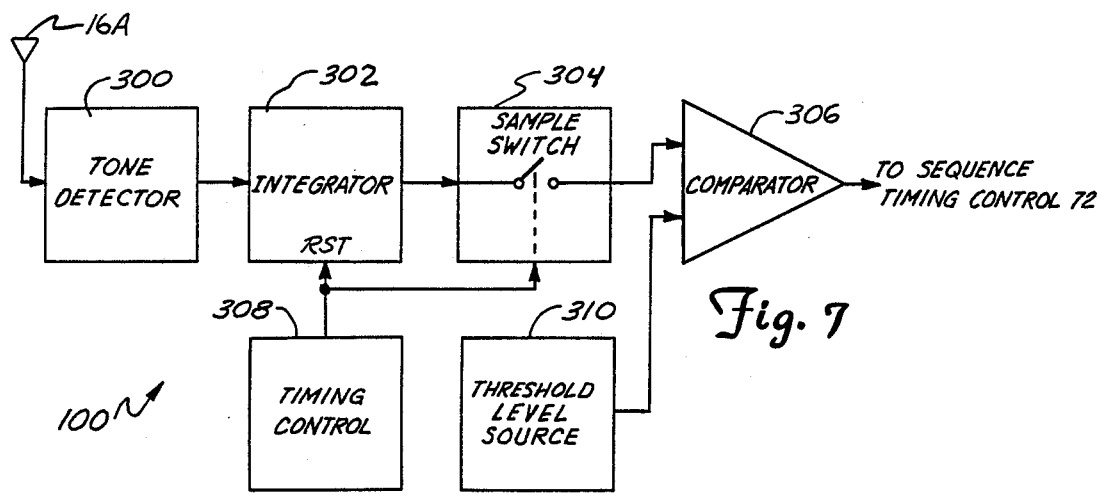
FIG. 7 is a first preferred embodiment of the transmission enable circuit illustrated in FIG. 5.

One preferred embodiment of transmission enable circuit 100 is illustrated in block diagram form in FIG. 7. As shown, this embodiment includes tone detector 300, integrator 302, sample switch 304, comparator 306, timing control 308 and threshold level source 310. Tone detector 300, which is operatively coupled to antenna 16A, detects the tone or other activation signal transmitted from interrogate/receiver 18 and produces a detected activation signal in response thereto. The detected activation signal is then applied to integrator 302.

Timing control 308 times integration periods having a predetermined length, and produces signals representative thereof. In one preferred embodiment, timing control 308 times integration periods of one second in length. The integration periods timed by timing control 308 of transponders 14A-14C are randomly skewed with respect to each other. In other words, the integration periods of each transponder 14A-14C all begin and end at randomly determined times with respect to those of other transponders 14A-14C. In one preferred embodiment, this randomization is accomplished by connecting a source of power such as batteries (not shown), to timing control 308 of each transponder 14A-14C at random times. For example, this can be done when transponders 14A-14C are assembled, or mounted to meters 12A-12C. Randomization is also achieved through drifts in timing periods resulting from normal circuit tolerances.

Integrator 302 includes a reset (RST) terminal connected to receive the timing control signal from timing control 308, and is reset by a beginning of each timing control period. Integrator 302 then integrates any detected activation signal received from tone detector 300 over its integration period. An integrator output signal representative of an integral of the detected activation signal is applied to sample switch 304.

Sample switch 304 is responsive to timing control 308 and causes the integrator output signal to be applied to comparator 306 at the end of each integration period. The integrator outut signal is then compared to a predetermined threshold level such as that established by threshold level source 310. If the integrator output signal has attained the threshold level, comparator 306 produces an enable signal indicating that a valid energizing signal has been received from interrogate/receiver 18.

In one preferred embodiment, threshold level source 310 produces a signal representative of an activation signal detected for 75% of the integration period. In this preferred embodiment, assuming a one second integration period, tone detector 300 must detect the activation signal for at least 750 milliseconds during an integration period before an enable signal will be produced. The enable signal is then applied to sequence timing control 72. If during the integration period the integral of any detected activation signal was less than the threshold level, the enable signal is not produced because enable circuit 100 has not received a "valid" activation signal. Since the integration periods are randomly skewed with respect to each other, transmission enable circuit 100 of each transponder 14A-14C will produce its enable signal at a random time after interrogate/receiver 18 transmits the activation signal.

Figure 8:
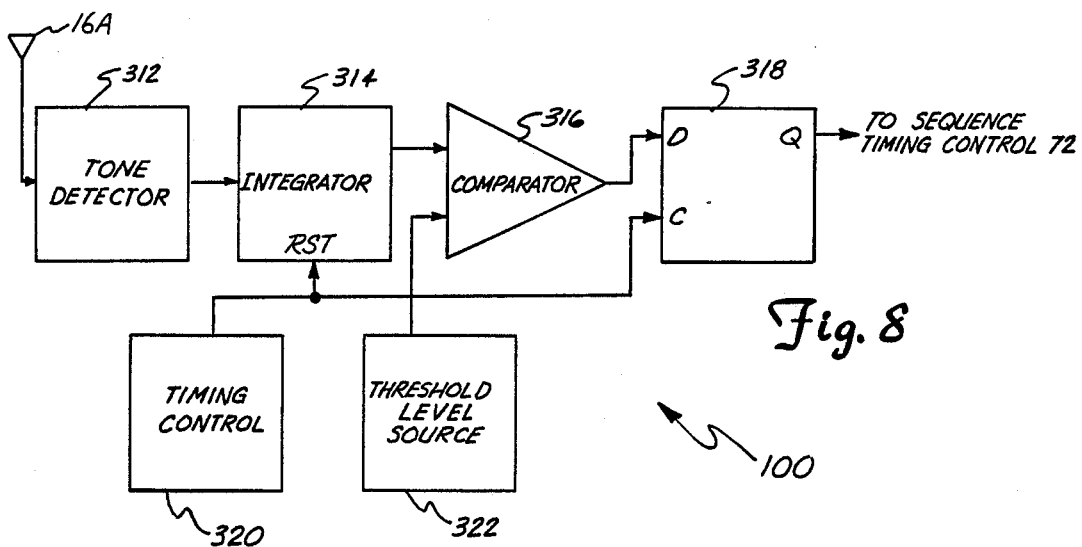
FIG. 8 is a second preferred embodiment of the transmission enable circuit ilustrated in FIG. 5.

A second preferred embodiment of transmission enable circuit 100 is illustrated in FIG. 8. As shown, the second preferred embodiment includes tone detector 312, integrator 314, comparator 316, D flip-flop 318, timing control 320, and threshold level source 322. Tone detector 312, integrator 314, comparator 316, timing control 320 and threshold level source 322 can all be identical to their counterparts previously described with reference to FIG. 7, and function in an identical manner. Comparator 316 continuously produces a comparator output signal representative of the comparison between the integrator output signal and the threshold level. The comparator output signal is clocked to the Q output terminal of D flip-flop 318 only at the end of integration periods. The embodiment of transmission enable circuit 100 shown in FIG. 8 is functionally identical to that of FIG. 7.

Although the present invention has been described with reference to preferred embodiments, workers skilled in the art will recognize that changes may be made in form and detail without departing from the spirit and scope of the invention.

What is claimed is:

1. An RF transponder suitable for use with an automatic/remote instrument monitoring system wherein the transponder is one of a plurality of such transponders configured to operate with at least one of a plurality of parameter sensing instruments remotely located from an interrogate/receiver which transmits an RF activation signal to said transponders and which receives and processes RF transponder signals received from the transponders, said transponder comprising:

preamble field means for providing a preamble field of predetermined preamble data;

instrument parameter field means adapted for interconnection to a parameter sensing instrument for providing an instrument parameter fielf of instrument parameter data sensed by the instrument;

instrument identification field means for providing an instrument identification field of instrument identification data;

BCH error control coding means for error control coding at least a portion of the fields of data including the preamble field data, instrument parameter field data, and instrument identification field data, and for providing an error control code field of BCH error control code data;

transmission enable means for receiving an RF activation signal from an interrogate/receiver and for providing a transponder enable signal in response thereto;

sequence control means coupled to the transmission enable means, preamble field means, instrument parameter field means, instrument identification field means and BCH error control code means, for causing the fields of data to be assembled in a predetermined manner to produce a plurality of transponder information packets in which the BCH error control code field follows the instrument identification field, the instrument identification field follows the instrument parameter field, and the instrument parameter field follows the preamble field, in response to the transponder enable signal;

transmission encoding means for transmission encoding the transponder information packets and producing transmission encoded transponder information packets;

data path control means for causing the portion of the fields of data to be error control coded to be simultaneously transferred to the transmission encoding means and to the BCH error control coding means, and for causing the error control code field of data to be transferred to the transmission encoding means following the transfer to the transmission encoding means of the portions which have been BCH error control coded;

RF transmitter means operatively coupled to receive the transmission encoded transponder information packets for transmitting an RF transponder signal including the transmission encoded transponder information packets; and frequency control means coupled to the RF transmitter means for actively varying a frequency of the RF transponder signal such that transponder information packets thereof can be transmitted at different frequencies within a predetermined frequency bandwidth.

2. The RF transponder of claim 1 wherein the BCH error control coding means provides an error control code field of shortened 255, 239, 2 BCH error control code data.

3. The RF transponder of claim 2 wherein the shortened BCH error control code is generated by the polynomial $P(X) = 1 + X + X^5 + X^6 + X^8 + X^9 + X^{10} + X^{11} + X^{13} + X^{14} + X^{16}$.

4. The RF transponder of claim 1 wherein the transmission encoding means comprises Manchester transmission encoding means for producing a Manchester encoded bit stream of data.

5. The RF transponder of claim 1 wherein:

the preamble field means includes preamble shift register means responsive to the sequence control means for receiving the preamble data in a parallel format and for serial field data transfer;

the instrument parameter field means includes instrument parameter shift register means responsive to the sequence control means for receiving the instrument parameter data in a parallel format and for serial field data transfer;

the instrument identification field means includes instrument identification shift register means responsive to the sequence control means for receiving the instrument identification data in a parallel format and for serial field data transfer; and the BCH error control coding means includes error control coding shift register means responsive to the sequence control means for serially receiving the portion of the fields of data to be error control coded, and for serial field data transfer.

6. The RF transponder of claim 5 wherein the data path control means causes the portion of the fields of data to be error control coded to be serially transferred to the transmission encoding means and to the BCH error control coding means, and causes the error control code field of data to be serially transferred to the transmission encoding means following the transfer of the portions which have been BCH error control coded.

7. The RF transponder of claim 6 wherein:
the instrument identification shift register means is operatively coupled to the instrument parameter shift register means for serial field data transfer;
the instrument parameter shift register means is operatively coupled to the data path control means for sreial field data transfer;
the data path control means is operatively coupled to the preamble shift register means and the error control code shift register means for serial field data transfer;
the preamble shift register means is operatively coupled to the transmission encoding means for serial field data transfer; and
the sequence control means causes the error control code field to follow the instrument identification field, the instrument identification field to follow the instrument parameter field, and the instrument parameter field to follow the preamble field in the transmission encoded transponder information packets.

8. The RF transponder of claim 7 wherein:
the transponder further includes tamper field shift register means responsive to the sequence control means and operatively coupled between the instrument parameter shift register means and the instrument identification shift register means for receiving tamper data representative of instrument tampering in a parallel format, and for serial field data transfer; and
the sequence control means causes the tamper field to follow the instrument parameter field in the transmission encoded transponder information packets.

9. The RF transponder of claim 8 wherein:
the transponder further includes instrument type field shift register means responsive to the sequence control means and operatively coupled between the preamble shift register means and the instrument parameter shift register means for receiving instrument type data in a parallel format, and for serial field data transfer; and
the sequence control means causes the instrument type field to follow the preamble field in the transmission encoded transponder information packets.

10. The RF transponder of claim 9 wherein:
the transponder further includes spare field shift register means responsive to the sequence control means and operatively coupled between the preamble shift register means and the instrument type shift register means for receiving spare data in a parallel format and for serial field data transfer; and
the sequence control means causes the spare field to follow the preamble field in the transmission encoded transponder information packets.

11. The RF transponder of claim 1 wherein the preamble field means provides a preamble field of data which is twenty-one bits in length.

12. The RF transponder of claim 11 wherein the preamble field means provides a preamble field of data representative of 111110010101001100000 sequence of digital values.

13. The RF transponder of claim 1 wherein the sequence control means causes the predetermined number of transponder information packet to be separated in time from adjacent transponder information packets.

14. The RF transponder of claim 1 wherein the transmission enable means produces the enable signal at a random time within a predetermined time period after receipt of an RF activation signal.

15. The RF transponder of claim 1 wherein the transmission enable means produces the enable signal upon receipt of an RF activation signal having predetermined frequency characteristics.

16. The RF transponder of claim 15 wherein the transmission enable means produces the enable signal upon receipt of an activation signal in the form of a tone modulated onto an RF carrier.

17. In an automatic/remote instrument monitoring system of the type having a plurality of RF transponders associated with one of a plurality of parameter sensing instruments remotely located from an interrogate/receiver which transmits an RF activation signal to the transponders and which receives and processes RF transponder signals from the transponders; a protocol by which the RF transponder signals are transmitted from the transponders to the interrogate/receiver in response to an activation signal therefrom, comprising:
providing a preamble field of predetermined preamble data;
providing an instrument parameter field of instrument parameter data sensed by an instrument;
providing an instrument identification field of instrument identification data;
BCH error control coding at least a portion of the fields of data including the preamble field data, instrument parameter field data, and instrument identification field data, and providing an error control code field of BCH error control code data;
transmission encoding the fields of data;
simultaneously BCH error control coding and transmission encoding the portion of the fields of data to be error control coded;
transmission encoding the field of BCH error control code data following the transmission encoding of the portion of the fields of data which were error control coded;
assembling the transmission encoded fields of data in a predetermined manner to produce a plurality of transponder information packets in which the error control code field follows the instrument identification field, the instrument identification field follows the instrument parameter field, and the instrument parameter field follows the preamble field; and
transmitting the transponder information packets at different frequencies within a predetermined frequency bandwidth as a transponder signal.

18. The protocol of claim 17 wherein BCH error control coding includes providing an error control code field of shortened 255, 239, 2 BCH error control code data.

19. The protocol of claim 18 wherein BCH error control coding includes providing an error control code field of shortened 255, 239, 2 BCH error control code data generated by the polunomial $P(X)=1+X+X^5+X^6+X^8+X^9+X^{10}+X^{11}+X^{13}+X^{14}+X^{16}$.

20. The protocol of claim 17 wherein providing a preamble field of data includes providing a preamble field of data representative of a 111110010101001100000 sequence of digital values.

21. The protocol of claim 17 wherein transmitting the bit stream of data includes on-off key modulating an RF carrier with the transmission encoded bit stream of data.

22. The protocol of claim 17 wherein transmission encoding includes Manchester transmission encoding the fields of data.

23. In an automatic/remote instrument monitoring system of the type having a pluarlity of RF transponders configured to operate with at least one of a plurality of parameter sensing instruments remotely located from an interrogate/receiver which transmits an RF activation signal to the transponders and which receives and processes RF transponder signals from the transponders, an enable circuit associated with each transponder for causing transponders of the system to initiate transmission of their RF transponder signals at random times with respect to one another in response to the RF activation signal, the enable circuit comprising:

RF detector means for receiving the RF activation signal from the interrogate/ receiver, detecting the activation signal, and producing a detector signal representative thereof;

timing means for timing integration periods, wherein the integration periods of the transponders of the system are randomly skewed with respect to each other;

integrator means operatively coupled to the timing means and the RF detector means for integrating the detector signal over the integration periods and producing an integrator output signal representative of an integral of the detector signal; and comparator means for comparing the integrator output signal to a threshold value and for producing a transponder enable signal causing the transponder to initiate transmission of its RF transponder signal at random times with respect to other transponders of the system, if the integrator output signal attains the threshold value during an integration period.

24. The circuit of claim 23 wherein the interrogate/receiver transmits an RF activation signal having predetermined frequency characteristics.

25. The circuit of claim 24 wherein the interrogate/receiver transmits an RF activation signal in the form of a tone modulated onto an RF carrier.

26. The circuit of claim 24 wherein:
the RF activation signal is amplitude modulated onto the RF carrier; and
the RF detector means comprises amplitude modulation detector means.

27. The circuit of claim 24 wherein:
the interrogate/receiver transmits an RF activation signal in the form of a tone modulated onto an RF carrier; and
the RF detector means produces a detector signal representative of the detected tone.

28. The circuit of claim 23 wherein:
the timing means causes the integration periods to be approximately one second in length.

29. The circuit of claim 23 wherein the comparator means compares the integrator output signal to a threshold value representative of an RF activation signal having a duration of approximately 75% over the integration period.

30. The circuit of claim 23 wherein the comparator means produces the transponder enable signal at an end of the integration periods if the integrator output signal attains the threshold value during the integration periods.

31. The circuit of claim 23 and further including switch means intermediate the integrator means and the comparator means and responsive to the timing means for switchably interconnecting the integrator means to the comparator means at an end of the integration periods, thereby causing the comparator means to produce the transponder enable signal at the end of the integration period if the integrator output signal has attained the threshold value.

32. The circuit of claim 23 and further including flip-flop means having a clock input responsive to the timing means, a data input coupled to the comparator means, and a data output, the flip-flop means clocking the transponder enable signal to the data output at the end of the integration periods if the integrator output signal has attained the threshold value during the integration periods.

* * * * *